United States Patent [19]
Schmitt

[11] 3,800,913
[45] Apr. 2, 1974

[54] RECIRCULATING OIL SYSTEM

[75] Inventor: James L. Schmitt, Washington, Ill.

[73] Assignee: Caterpillar Tractor Co., Peoria, Ill.

[22] Filed: Aug. 4, 1972

[21] Appl. No.: 278,014

[52] U.S. Cl. .............................. 184/6.13, 74/606 R
[51] Int. Cl. .......................................... F01m 1/12
[58] Field of Search .............. 184/6 R, 6.13, 103 R; 123/196 R; 74/606 R

[56] References Cited
UNITED STATES PATENTS

| | | | |
|---|---|---|---|
| 2,874,804 | 2/1959 | Haas | 184/6.13 |
| 3,590,953 | 7/1971 | Wellauer | 184/6.13 |
| 2,743,627 | 5/1956 | Christenson | 74/606 R |
| 2,925,146 | 2/1960 | Davis | 184/6.13 |

Primary Examiner—Manuel A. Antonakas
Attorney, Agent, or Firm—Fryer, Tjensvold, Phillips & Lempio

[57] ABSTRACT

There is disclosed an oil supply and recirculating system for a motor vehicle in combination with the transmission and differential of the vehicle. The oil supply system comprises an oil reservoir comprising three separate oil receiving chambers, one of the reservoirs being the main oil supply reservoir, with one chamber receiving and serving as the transmission sump, while the remaining reservoir serves as the differential sump and overflow reservoir for the main supply reservoir. The system includes a main supply and control system pump for supplying pressurized fluid for operation and control of the transmission, and a second scavenging pump operative to scavenge the transmission sump and to recirculate oil from the overflow tank to the main supply tank.

8 Claims, 1 Drawing Figure

PATENTED APR 2 1974
3,800,913
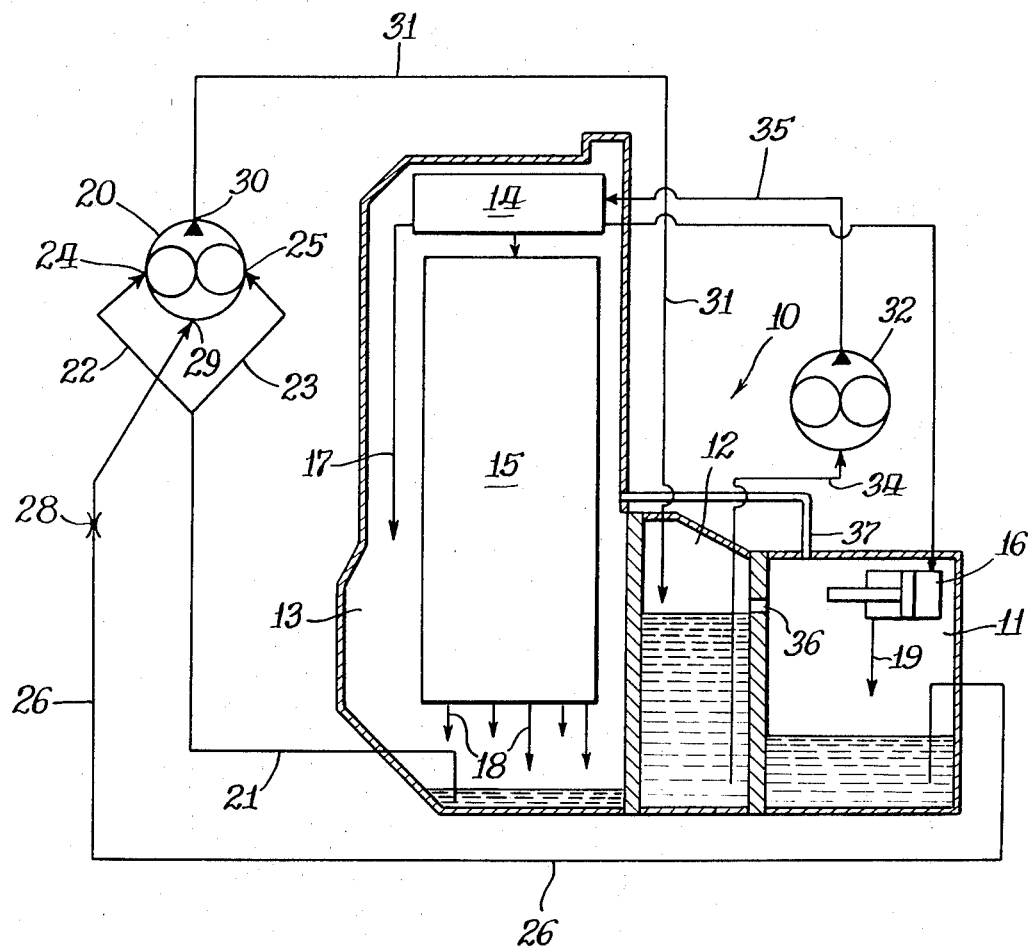

RECIRCULATING OIL SYSTEM

BACKGROUND OF THE INVENTION

Motor vehicles normally employ multi-speed transmissions and differential systems in the drive train for transmission of power from the vehicle engine to the driving wheels. The transmission and differential may both employ pressurized fluid for actuation of brakes, clutches, and shifting of gears and the like, while at the same time both systems normally employ lubricating oil which must be circulated through the system in order to insure proper lubrication and to cool the fluid and working parts.

A great savings in material and parts may be achieved by combining the lubricating systems and the hydraulic operating systems or control systems within the transmission and the differential. It is also possible to avoid further duplication by combining the systems for both the transmission and the differential into a single system. However, the combining of these systems does present other problems. These problems are chiefly the result of diverse operating conditions within transmissions and differentials.

The transmission, for example, will normally employ a high volume of oil for both control (i.e., brake and clutch actuation) and for lubrication. However, the transmission should not be submerged in oil in order to avoid excessive frictional losses. Therefore, the transmission sump must be pumped essentially dry at all times.

The oil in the differential sump must be kept at a predetermined minimum level because the differential gears run partially submerged in order to obtain adequate lubrication. Because of this manner of lubricating the differential gears, the oil in the differential sump becomes aerated. This aerated oil is undesirable for control systems, and in some instances for lubrication, because the air bubbles can cause cavitation, resulting in pitting and excessive wear.

These problems must be overcome before such systems can be satisfactorily combined.

SUMMARY AND OBJECTS OF THE INVENTION

It is a primary object of the present invention to provide a combined recirculating oil system for a transmission and differential that overcomes the above disadvantages of the prior art systems.

Another object of the present invention is to provide a novel and efficient recirculating oil system for the transmission and differential of a motor vehicle.

In accordance with the present invention, there is provided a recirculating oil system for combined use with a differential and transmission, and comprising a plurality of oil reservoirs to control use of the oil within the system. There is also provided a transmission control supply pump and a second pump serving as a scavenging pump and as a recirculation pump.

BRIEF DESCRIPTION OF THE DRAWING

The above and other objects and advantages of the present invention will become apparent from the following description or specification when read in conjunction with the drawing, which is a schematic layout of a recirculating oil system in accordance with the present invention.

DETAILED DESCRIPTION OF PREFERRED EMBODIMENT

Referring to the drawing, there is illustrated an oil system having an oil tank or reservoir, generally designated by the numeral 10, and comprising three separate compartments or reservoirs 11, 12 and 13 respectively. The compartment 11 is a differential sump in which the differential gears operate and into which control fluid for operation of the differential (not shown) is drained via line 19. This sump or reservoir also serves as an overflow sump for the main oil supply tank 12.

The main supply tank 12 serves to contain or receive oil for the main oil and control system, to be described.

The transmission sump 13, in the illustrated embodiment, serves to contain a transmission control valve package 14 and a transmission unit 15. A portion of the oil and control fluid or lubricating and control fluid from valve 14 and transmission 15 is drained directly into the transmission sump 13. This drain is, for example, by way of lines illustrated as 17 and 18.

In order to maintain the oil level in the transmission sump 13 at a sufficiently low level to prevent frictional losses in the transmission, this sump is pumped essentially dry at all times. In order to maintain this sump dry, a suitable scavenge pump in the form of a gear pump 20 draws oil by way of conduit 21, which divides into conduits 22 and 23 to communicate with a pair of separate spaced inlets 24 and 25.

Pump 20 also draws oil by way of conduit 26 from the differential sump 11. The conduit means 26 includes restricting means 28, and communicates by way of inlet 29 of scavenge pump 20, which inlet is disposed substantially centrally of the two impeller gears of the pump. This orifice or restriction 28 limits the amount of fluid pumped from sump 11 to a controlled amount. This limiting of the amount of oil taken from sump 11 assures an adequate level of oil in sump 11, and a controlled mixing of the aerated oil with non-aerated oil from sump 13.

The scavenge pump 20 includes a single outlet 30, which communicates by means of line or conduit 31 with main supply tank 12. In the practical or preferred embodiment of the invention, pump 20 scavenges sump 13 essentially dry of oil which amounts to approximately 35 to 40 gallons per minute. At the same time, the pump draws a controlled amount of oil which amounts to approximately 4 gallons per minute from the sump 11.

This oil is supplied by means of pump 20 to the main control supply tank 12 to maintain an adequate supply therein for lubricating and controlling purposes.

The main lubricating and control system comprises a main pump 32, which is operatively connected by way of a conduit 34 to draw oil from the supply tank or chamber 12 and deliver it by way of a conduit 35 to the control valve 14. The control valve 14 distributes the oil to the proper areas of the transmission 15 for lubricating, shifting and cooling the transmission. The main control valve 14 also distributes oil for control of the differential lock piston 16. As pointed out above, a portion of this oil from the transmission drains directly into sump 13 and another portion is returned to the control valve, from which it is then emptied or drained into sump 13.

The amount of oil scavenged by pump 20 and delivered to the main supply tank 12 will normally exceed the amount of oil drawn from the main tank by the main pump 32. In order to compensate for this difference in volumes, an overflow opening 36 is provided in the tank 12, which allows any excess oil over the desired maximum to flow into the sump tank 11. Ideally, the amount of oil flowing into tank 11 from tank 12 and the differential lock piston 16, will be equal to the amount of oil scavenged from tank 11 by the scavenge pump 20. Proper control of this amount of fluid drawn from the tank 11 will keep the oil therein at an optimum operating level. In order to equalize pressure between the sumps 13 and 11, a vent line 37 provides communication therebetween to prevent a build-up of pressure in either tank.

The pump 20 substitutes for two pumps which would ordinarily be required to control the two separate sumps. However, the use of a single pump in a specified arrangement eliminates the expense of two separate pumps and also the extra space required for such an arrangement. The three inlet pump, as provided herein, and the specific inlet arrangement provided, permits the separation and controlled pumping by means of pump 20 to replace multiple pumps that would ordinarily be required. The specific inlet arrangement also helps to reduce aeration of the oil. The vacuum resulting from the limited flow to inlet 29 is taken up by the higher volumes of fluid to inlets 24 and 25.

While the present invention has been disclosed by means of a preferred embodiment, it is to be understood that numerous modifications and changes may be made in the construction and operation of the illustrated embodiment, without departing from the spirit and scope of the present invention, as defined in the appended claims.

What is claimed is:

1. A recirculating oil system in combination with a hydraulically controlled transmission and a differential, said system comprising:
   oil reservoir means comprising three separate chambers;
   said chambers comprising a main supply chamber, a transmission sump, and a differential sump;
   a transmission disposed in said transmission sump;
   a differential disposed in said differential sump;
   a scavenge pump;
   conduit means operatively connecting said scavenge pump to draw oil from said transmission sump and from said differential sump and supply said oil to said main sump chamber; and,
   a main supply pump operatively connected to draw oil from said supply tank and deliver it to said transmission.

2. The oil system of claim 1 comprising restriction means in said conduit between said differential sump and said scavenge pump.

3. The oil system of claim 1 wherein said scavenge pump comprises three inlets;
   said transmission sump is in communication with two of said inlets; and,
   said differential sump is in communication with the other of said inlets.

4. The oil system of claim 3 comprising restricting means in said conduit means communicating said differential sump with said scavenge pump.

5. The oil system of claim 4 wherein said scavenge pump is a gear pump;
   said restricted conduit communicates with an inlet disposed between said gears; and,
   said two of said inlets communicate separately with each of said two gears.

6. A recirculating oil system comprising in combination:
   a first oil reservoir;
   a transmission disposed in said first reservoir;
   a second oil reservoir;
   a pump operatively connected to scavenge said first reservoir;
   said pump operatively connected by conduit means including restriction means to draw a restricted amount of oil from said second reservoir and supply said oil to a third reservoir.

7. The oil system of claim 6 wherein said scavenge pump comprises three inlets;
   said first reservoir is in communication with two of said inlets; and,
   said second reservoir is in restricted communication with the other of said inlets.

8. The oil system of claim 7 wherein said scavenge pump is a gear pump;
   said restricted communication is with an inlet disposed between said gears; and,
   said two of said inlets communicate separately with each of said two gears.

* * * * *